United States Patent [19]

Hayashi et al.

[11] 4,299,793
[45] Nov. 10, 1981

[54] METHOD AND APPARATUS FOR PRODUCING TUBULAR PLASTIC FILMS

[75] Inventors: Kohtaro Hayashi, Chibaken; Ko Morihara, Chibashi; Kohji Nakamura, Chibaken, all of Japan

[73] Assignee: Chisso Engineering Co., Ltd., Tokyo, Japan

[21] Appl. No.: 105,270

[22] Filed: Dec. 19, 1979

[30] Foreign Application Priority Data

Dec. 25, 1978 [JP] Japan ................................ 53/159458

[51] Int. Cl.³ ........................ B29D 23/04; B29F 3/00
[52] U.S. Cl. ................................... 264/564; 137/224; 264/40.3; 425/72 R; 425/140; 425/326.1
[58] Field of Search ................... 425/72 R, 326.1, 140; 264/40.1, 40.3, 564, 565; 137/224, 225

[56] References Cited

U.S. PATENT DOCUMENTS

| | | | |
|---|---|---|---|
| 2,668,323 | 2/1954 | Johnson | 425/72 R |
| 3,841,816 | 10/1974 | Herz | 425/326.1 |
| 3,888,961 | 6/1975 | Schonewald | 264/528 |
| 3,947,170 | 3/1976 | Zimmermann | 425/72 R |
| 4,140,460 | 2/1979 | Carlsen | 264/40.3 |
| 4,189,288 | 2/1980 | Halter | 264/40.3 |

FOREIGN PATENT DOCUMENTS 1017398 1/1966 United Kingdom ............. 425/326.1

*Primary Examiner*—Jeffery R. Thurlow
*Attorney, Agent, or Firm*—Fred Philpitt

[57] ABSTRACT

An apparatus for producing tubular plastic films having extremely small variation of flat width in stabilized manner is provided. Said apparatus comprises a blower, a valve for controlling the amount of air, an air reservoir, a connecting pipe for connecting these blower, valve and air reservoir and another connecting pipe which connects said reservoir to the inside of a bubble formed on the tip end of a mold fixed to the outlet of an extruder through said mold to feed or discharge the air into the inside of said bubble continuously in a non-step manner, thereby to keep the inside pressure of said bubble uniform.

3 Claims, 1 Drawing Figure

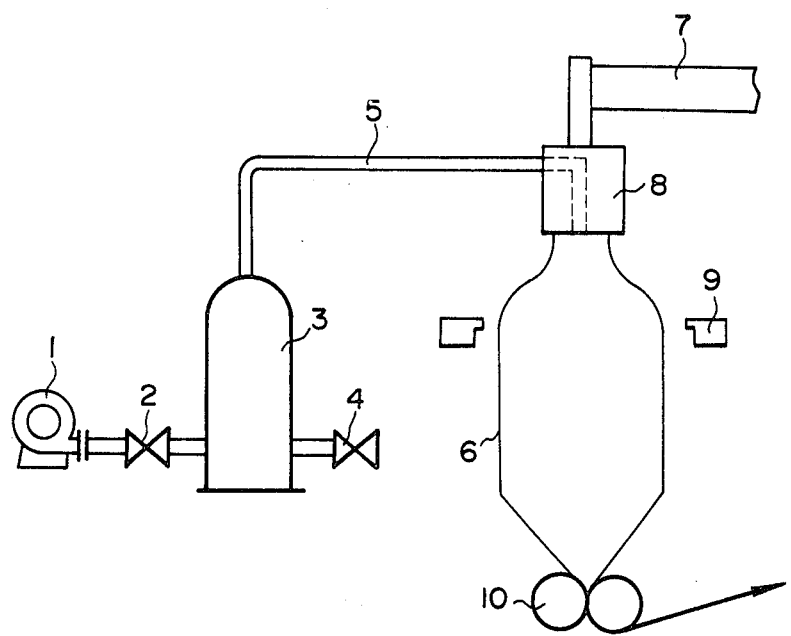

METHOD AND APPARATUS FOR PRODUCING TUBULAR PLASTIC FILMS

BACKGROUND OF THE INVENTION

1. Field of the Invention

This invention relates to a novel apparatus for adjusting the inside pressure of bubble for producing a tubular film of thermoplastic plastics in a stabilized manner.

2. Description of the Prior Art

For producing tubular films in general according to an inflation process, various processes have been known in order to keep their flattened widths at constant values. For example, there is a process in which the size of an inflated bubble or its flattened width is automatically detected and the amount of gas (mainly air) is automatically adjusted according to the result obtained, and this process is used commonly in most of cases. Further, for example, a method is also known in which a cylinder for regulating the inner diameter of a bubble is provided inside the bubble. According to the former process, however, it is the present status that owing to a lag of actuation or intermittent actuations in response to detection, the inside pressure of a bubble fluctuates in the strict sense. Particularly, in case of films having a narrow width, this phenomenon appears more, and further in case of thicker films of 0.1 mm or more, since the upper and lower film parts at the creases formed on both the ends of flattened film obtained by means of rolls after stretching, do not adhere closely to each other, gas inside a bubble leaks continuously. On this account, it is preferable to use a process in which gas is continuously supplemented. Further, according to the latter process, the width of films is maintained at constant values but flaws are created by the contact with a regulating cylinder inside a bubble and exert a serious bad influence upon the quality of films. Thus their usage is considerably limited. Since these problems greatly injure the optical characteristic properties and the stability of dimensional accuracy of raw films for producing biaxially oriented polypropylene films, the above-mentioned well-known processes are not practically useful.

An object of the present invention is to provide a process for producing stabilized tubular films with extremely small fluctuation of flat width, by overcoming completely the above-mentioned drawbacks. In producing inflation films without any cylindrical body for regulating an inside diameter, the diameter of a bubble is determined by the pressure balance between the gas inside a bubble and the gas or liquid outside a cylindrical body. More concretely, the bubble is more inflated with increase of the pressure inside the bubble, and deflated with decrease thereof. Accordingly, the inside pressure and the inflation state of the bubble can be maintained at a constant state by discharging or charging continuously and rapidly the gas inside the bubble which increases or decreases by some reason or others. In general, the pressure loss of a gas flowing through the inside of a pipe is proportional to the square of the flow amount of that gas. When the variation of flow amount relative to a constant flow amount is extremely small as compared with the original flow amount, the variation of pressure loss is also extremely small.

We have paid attention to the above-mentioned fact and completed an apparatus of the present invention as a device which is added in order to discharge or charge immediately and continuously the gas inside a bubble.

BRIEF DESCRIPTION OF THE DRAWING

The apparatus of the present invention will be explained fully referring to the accompanying drawing, which shows the connection system of each part of the inflation apparatus of the present invention of an air-cooling and descending type.

PREFERRED EMBODIMENT OF THE INVENTION

In the apparatus of the present invention, the atmospheric air is used as a gas, and by a blower 1 shown in the accompanying drawing, air is blown into an air reservoir 3. The amount of air is regulated by a control valve 2 provided between the blower and the reservoir non-stepwise. The amount of air blown therein is discharged into the atmosphere through a discharge valve 4 so long as there is no outside disturbance, and the portion of pressure drop at this time becomes the static pressure inside the air reservoir 3. In order to reduce the influence of this air flow as small as possible, the control valve 2 and the discharge valve 4 are arranged preferably along the extension toward both the sides, of the diameter of the horizontal cross-section of the air reservoir 3, taken on the same level as that of these valves, and the above-mentioned static pressure is transmitted into the inside of a bubble 6 in the inflation apparatus through a connecting pipe 5 and a mold 8 from a position separated as remote as possible. In addition, numeral 7 is an extruder, 9 is a cooling ring and 10 is take-up rolls.

In this apparatus, it is preferable that the blower 1 has a capacity of sending air in an amount more than hundred times the amount of air varied in the inflation apparatus, and the air reservoir 3 has a capacity more than one-tenth of the air amount of the blower delivered in one minute and has a shape as slender as possible. In this case, the difference of pressure drop created in the discharge valve 4 is $$\left\{ 1 - \left( \frac{100 \pm 1}{100} \right)^2 \right\}$$

or less, and can be controlled to 2% or less. For example, when the inside pressure of a plastic bubble is balanced at a water head of 100 mm and the air amount therein is about to fluctuate in an air amount of one-hundredth of that of the blower, the fluctuation of the pressure loss at the discharge valve 4 becomes 2% i.e. a water head of 2 mm. Thus, there is no practical problem.

The apparatus of the present invention can be utilized broadly in film production apparatus of tubular films according to an inflation process, and its effect is notable particularly in case of films of narrow width, high speed or large thickness. Particularly, in case of a large thickness, since stabilized film-production can be made even for such a large thickness of about 2 mm, it can be also utilized in the field of so-called soft tubes which are outside the range of film-making apparatus.

The tubular films as used herein also include such soft tubes. Further, in the apparatus of the present invention, since the gas which is taken in or discharged through a shaping mold is in a minimum necessary amount, and it is carried out continuously, the influence of temperature change upon the mold is extremely small as compared with that of other apparatuses and is in a negligible range.

The apparatus of the present invention will be further illustrated by the following non-limitative examples.

EXAMPLES 1 and 2

Film-production was carried out employing the apparatus of the present invention. The results are shown in the following Table 1.

TABLE 1

| | No. of experiment | Example 1 | Example 2 |
|---|---|---|---|
| Conditions | Raw material used | polypropylene | medium low pressure polyethylene |
| | Film production manner | water-cooling manner | air-cooling manner |
| | Extruder | 65 mmφ | 50 mmφ |
| | Flat width of film | 100 mm | 100 mm |
| | Thickness of film | 1.2 mm | 1.0 mm |
| | Film production speed | 8 m/min. | 5 m/min. |
| Result | Fluctuation of flat width of film | ±0.5 mm or less | ±1.0 mm or less |

Comparative examples 1 and 2

The following table 2 shows the results of tests carried out by enclosing and intercepting air inside a bubble as in the preceding Examples, but without using the apparatus of the present invention.

TABLE 2

| | No. of experiment | Comparative example 1 | Comparative example 2 |
|---|---|---|---|
| Conditions | Raw material used | polypropylene | medium low pressure polyethylene |
| | Film-production manner | water-wooling manner | air cooling manner |
| | Extruder | 65 mmφ | 50 mmφ |
| | Flat width of film | 100 mm | 100 mm |
| | Thickness of film | 1.2 mm | 1.0 mm |
| | Film production speed | 8 m/min. | 5 m/min. |
| Result | Fluctuation of flat width of film | Flat width was reduced at a rate of 1 mm per 5 seconds, and after 2 minutes, film production became unstable and operation was suspended. | Flat width was reduced at a rate of 1 mm per 12 seconds. |

Comparative examples 3 and 4

The following table 3 shows results of tests carried out as in the preceding Examples except that a tube regulator for feed air of automatic ON-OFF type which detects bubble diameter with a photocell was used and the apparatus of the present invention was not used.

TABLE 3

| | No. of experiment | Comparative example 3 | Comparative example 4 |
|---|---|---|---|
| Conditions | Raw material used | polypropylene | medium low polyethylene |
| | Film-production manner | water-cooling manner | air-cooling manner |
| | Extruder | 65 mmφ | 50 mmφ |
| | Flat width of film | 100 mm | 100 mm |
| | Thickness of film | 1.2 mm | 1.0 mm |
| | Film-production speed | 8 m/min. | 5 m/min. |
| Result | Fluctuation of flat width | more than ±5 mm. Film-production was unstable. | more than ±3 mm. |

What is claimed is:

1. In an apparatus for producing tubular plastic film in which molten plastic is extruded through an extrusion device in the form of a tube and the extruded tube thereafter expanded by the introduction of air under pressure into the interior of the extruded tube by means of an air inlet and an air supply system, the improvement comprising an air supply system that includes:
   (a) an air blower,
   (b) an air reservoir for receiving air discharged from said air blower,
   (c) a first conduit extending between said air blower and said air reservoir for transporting the air between said air blower and said air reservoir,
   (d) a valve in said first conduit for controlling the amount of air flowing between said air blower and said air reservoir,
   (e) a valved air outlet from said air reservoir for venting at least some of the air introduced into the air reservoir by said air blower,
   (f) a second conduit separate from said valved air outlet that extends between said air reservoir and the air inlet that introduces air into the extruded plastic tube, said second conduit being unobstructed by valve means,
whereby said air blower and said valved air outlet cooperate to establish an essentially static pressure condition in said air reservoir and said second conduit serves to insure that the air pressure in the reservoir and the air pressure in the interior of the extruded plastic tube are essentially the same.

2. An apparatus according to claim 1 wherein the port where said second conduit (f) is fixed to said air reservoir (b) is as apart as possible from the port where said first conduit (c) is fixed to said air reservoir (b) and also from the port where said valved air outlet (e) is fixed to said air reservoir (b).

3. In the known method of producing tubular plastic film by extruding molten plastic into the form of a tube and thereafter expanding the extruded tube by introducing air under pressure into the interior of said tube, the improvement comprising
   (a) establishing an air reservoir having an essentially static pressure condition by blowing air into a zone and simultaneously removing air from that zone at a lesser rate that it is blown in, and
   (b) establishing a direct unobstructed passageway between said reservoir and the interior of said extruded plastic tube so that the air pressure in the interior of said extruded plastic tube will be maintained at essentially the same pressure as the pressure in said reservoir,
whereby a tubular plastic film having extremely small variations in flat width are produced.

* * * * *